United States Patent
Orisich et al.

(10) Patent No.: US 10,661,700 B2
(45) Date of Patent: May 26, 2020

(54) BEZEL APPARATUS FOR USE WITH VEHICLE LAMPS AND RELATED METHODS

(71) Applicant: VALEO NORTH AMERICA, INC., Troy, MI (US)

(72) Inventors: John Orisich, Seymour, IN (US); Mark Pattison, Troy, MI (US); Ambroise Servantie, Seymour, IN (US)

(73) Assignee: VALEO NORTH AMERICA, INC., Troy, MI (US)

( * ) Notice: Subject to any disclaimer, the term of this patent is extended or adjusted under 35 U.S.C. 154(b) by 0 days.

(21) Appl. No.: 16/128,581

(22) Filed: Sep. 12, 2018

(65) Prior Publication Data

US 2020/0079274 A1   Mar. 12, 2020

(51) Int. Cl.
    *B60Q 1/04*   (2006.01)
    *F21S 41/55*  (2018.01)
    *F21S 45/10*  (2018.01)

(52) U.S. Cl.
     CPC ............ *B60Q 1/0466* (2013.01); *F21S 41/55* (2018.01); *F21S 45/10* (2018.01)

(58) Field of Classification Search
     CPC .......... B60Q 1/0466; F21S 41/55; F21S 45/10
     See application file for complete search history.

(56) References Cited

U.S. PATENT DOCUMENTS

| 6,561,679 | B1 | 5/2003 | Erion et al. |
| 2005/0025904 | A1 | 2/2005 | Giroud |
| 2015/0345730 | A1* | 12/2015 | Kim ........................ B60Q 1/24 362/516 |

FOREIGN PATENT DOCUMENTS

CN   206367370 U   8/2017

* cited by examiner

*Primary Examiner* — Anne M Hines
(74) *Attorney, Agent, or Firm* — Oblon, McClelland, Maier & Neustadt, L.L.P.

(57) ABSTRACT

Bezel apparatus for use with vehicle lamps are disclosed. A disclosed bezel for a vehicle lamp includes a skeleton defining a portion of the bezel. The skeleton is configured to provide structural integrity to the bezel. The bezel also includes a film configured to cover the skeleton. The film comprises a first side configured to contact the skeleton and a second side opposite to the first side and including a visual design. The bezel also includes a coupling mechanism configured to couple the film to the skeleton to provide a completed bezel.

17 Claims, 5 Drawing Sheets

BEZEL APPARATUS FOR USE WITH VEHICLE LAMPS AND RELATED METHODS

FIELD OF THE DISCLOSURE

This disclosure relates generally to vehicle lighting and, more particularly, to bezel apparatus for use with vehicle lamps and related methods.

BACKGROUND

Motor vehicles typically have lighting devices for both interior and exterior illumination. Some vehicles have exterior lamps (e.g., headlamps, tail lamps, etc.) including components that are particularly shaped, formed, and/or structured such as housings, lenses, reflectors, bezels, trim, etc. Often, drivers or vehicle owners desire customized aesthetic features for at least some of these components.

SUMMARY

An aspect of the present disclosure includes a bezel for a vehicle lamp. The bezel includes a skeleton defining a portion of the bezel. The skeleton is configured to provide structural integrity to the bezel. The bezel also includes a film configured to cover the skeleton. The film comprises a first side configured to contact the skeleton and a second side opposite to the first side and including a visual design. The bezel also includes a coupling mechanism configured to couple the film to the skeleton to provide a completed bezel.

In a further aspect of the present disclosure, the skeleton includes ribs distributed along a portion of the bezel and extending away therefrom near an inner surface of the first side of the film.

In a further aspect of the present disclosure, the ribs are disposed on an outer surface of the bezel such that recessed areas are formed by the ribs and the outer surface of bezel.

In a further aspect of the present disclosure, the skeleton includes a cross-section that defines a cellular pattern therein.

In a further aspect of the present disclosure, the cellular pattern includes polygons.

In a further aspect of the present disclosure, the skeleton defines an outer surface that is shaped to conform to an inner surface of the first side of the film.

In a further aspect of the present disclosure, an outer surface of the second side of the film and an outer surface of the bezel are adjacent to cooperatively form a substantially smooth outer surface.

In a further aspect of the present disclosure, the film is an IMD (In-Mold/In-Mould Decoration) or an IML (In-Mold/In-Mould Labeling).

In a further aspect of the present disclosure, the film has a thickness that is 2 mm or less.

In a further aspect of the present disclosure, the film includes an opening disposed on the outer surface that is shaped to receive a lens, a trim, a DRL (Daytime Running Light), or a light beam associated with the vehicle lamp.

In a further aspect of the present disclosure, the film is configured to transmit light therethrough to reveal the design when the light is received by the first side of the film In a further aspect of the present disclosure, the film is configured to separate from the skeleton.

Another aspect of the present disclosure includes a vehicle lamp. The vehicle lamp includes a bezel affixed to a housing of the vehicle lamp. The bezel has a first portion and a second portion that are configured to couple to and decouple from each other. The first portion at least partially defines a body of the bezel. The second portion at least partially defines an exterior surface of the bezel having a visual design.

In a further aspect of the present disclosure, the first portion of the bezel includes a skeleton positioned beneath an inner surface of the second portion to support the second portion.

In a further aspect of the present disclosure, the skeleton defines a first contour having a first shape and the second portion defines a second contour having second shape that is similar to the first shape.

In a further aspect of the present disclosure, the first portion of the bezel has a first edge defining a first outer surface of the first portion, and the second portion has a second edge proximate to the first edge and defining a second outer surface of the second portion. The first and second edges are adjacent such that the first and second outer surfaces define a substantially continuous surface.

In a further aspect of the present disclosure, the second portion has a substantially uniform thickness that is 2 mm or less.

In a further aspect of the present disclosure, the second portion is translucent.

Another aspect of the present disclosure includes a method to provide a bezel for a vehicle lamp. The method includes forming a skeleton that defines at least a portion of the bezel. The skeleton is configured to provide structural integrity to the bezel. The method also includes forming a film having a first side configured to contact the skeleton and a second side opposite to the first side and including a visual design. The method also includes coupling the film to the skeleton to provide a completed bezel.

In a further aspect of the present disclosure, the method also includes decoupling the film from the skeleton.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The figures are not to scale. In general, the same reference numbers will be used throughout the drawing(s) and accompanying written description to refer to the same or like parts.

DETAILED DESCRIPTION

Some vehicle headlamps include known bezels that facilitate coupling trim and/or lenses around or near a light source (e.g., a light-emitting diode, a light bulb, etc.) and/or serve as aesthetic accessories for the headlamps. For example, a known bezel may include particular graphical and/or structural designs on an outer surface thereof, which may be desirable to a driver or vehicle owner. Typically, these known bezels are formed by a single component, for example, via polycarbonate (PC) based injection molding. However, bezels produced in this manner often have areas of excess material that substantially increase weight of an associated headlamp. Additionally, these known bezels have specific designs based on an injection mold (e.g., machined via precision tools) that are permanent. As a result, if the bezel is damaged and/or the driver or vehicle owner desires a different bezel design, the entire bezel needs to be replaced (i.e., the bezel is scrapped) and/or a different injection mold needs to be produced, which incurs substantial costs.

Bezel apparatus for use with vehicle lamps and related methods are disclosed. Examples disclosed herein provide an example bezel having an example lightweight skeleton that receives an example film or skin (e.g., a relatively thin plastic). The disclosed film has a particular visual design (e.g., a graphic, a color, a surface feature or structure, a shape or geometry, etc.) for the bezel, which may be desirable to a driver or vehicle owner. In some examples, the film is polymethyl methacrylate (PMMA) based and has a thickness that is 2 millimeters (mm) or less. In some examples, the film includes an in-mold decoration (IMD) and/or an in-mold label (IML) to provide a particular graphical design. Such films are relatively inexpensive to produce. The disclosed skeleton forms at least a portion of the bezel in an area of the bezel that would have otherwise been associated with excess material and, in some examples, defines a structural pattern (e.g., a ribbed pattern, a cellular pattern, a lattice, etc.) for properly carrying and/or supporting the film, which substantially reduces weight of the disclosed bezel compared to the above mentioned known bezel architectures while maintaining structural integrity of the bezel. In particular, the skeleton is designed to resist constraints associated with a vehicle lamp (e.g., headlamp) such as, for example, vibrations, temperature, etc.

The skeleton can be produced for quick fitting to any desired geometry, for example, via an example injection mold and/or additive manufacturing (sometimes referred to as 3D printing). In some examples, after the film is produced, the film is provided within the injection mold associated with forming the skeleton. The film or skin may be held in place by a vacuum chuck, for example. Material for the skeleton is then injected to the mold to be produced together with the film and form an integral bezel component such that the film is not separable from the skeleton (i.e., the film is coupled to the skeleton). In this manner, if a different visual design is desired, disclosed examples produce, via the same injection mold, one or more other bezels having a similar skeleton but a different film (e.g., having a unique visual design for the bezel), which substantially reduces costs that would have otherwise been incurred by machining a new injection mold for the visual design.

In some disclosed examples, the disclosed bezel skeleton and film are produced separately and, in particular, are sized, shaped, structured, and/or otherwise configured to couple to and decouple or separate from each other, for example, via snap-fitting and/or any other appropriate attachment or bonding method or technique (e.g., via welding) that is permanent or not permanent. Additionally, in such examples, the skeleton of the bezel can be produced via additive manufacturing (sometimes referred to as 3D printing), which further reduces costs associated with producing the bezel and/or facilitates producing the skeleton with a lightweight structure. In this manner, if the film is damaged and/or a driver or vehicle owner desires a different visual design for the bezel, the film is easily removable (e.g., via the driver, personnel associated with a vehicle manufacturer or servicer, etc.) from the bezel skeleton and replaced with a different film having a different visual design without replacing and/or scrapping the entire bezel, which would have otherwise been unattainable using the above-mentioned known bezels. As a result, disclosed examples provide customizable, lightweight bezels and substantially reduce costs associated with the above-mentioned known bezels.

Additionally, in some examples, the film is used as an illuminator for a vehicle lamp. That is, in such examples, the film is translucent such that light travels therethrough, which reveals the design of the film. For example, a light source is coupled to the lamp and positioned behind the film to generate the light. Further, when the light source is off and/or otherwise not generating the light, the film hides the light source such that the light source is not visible from a position external to the vehicle. Further, still, in some examples, the film is configured to prevent glare in the lamp. For example, the film has an outer surface that is smooth and/or otherwise structured to disperse light emitted by one or more other light sources of the lamp.

Figure 1:
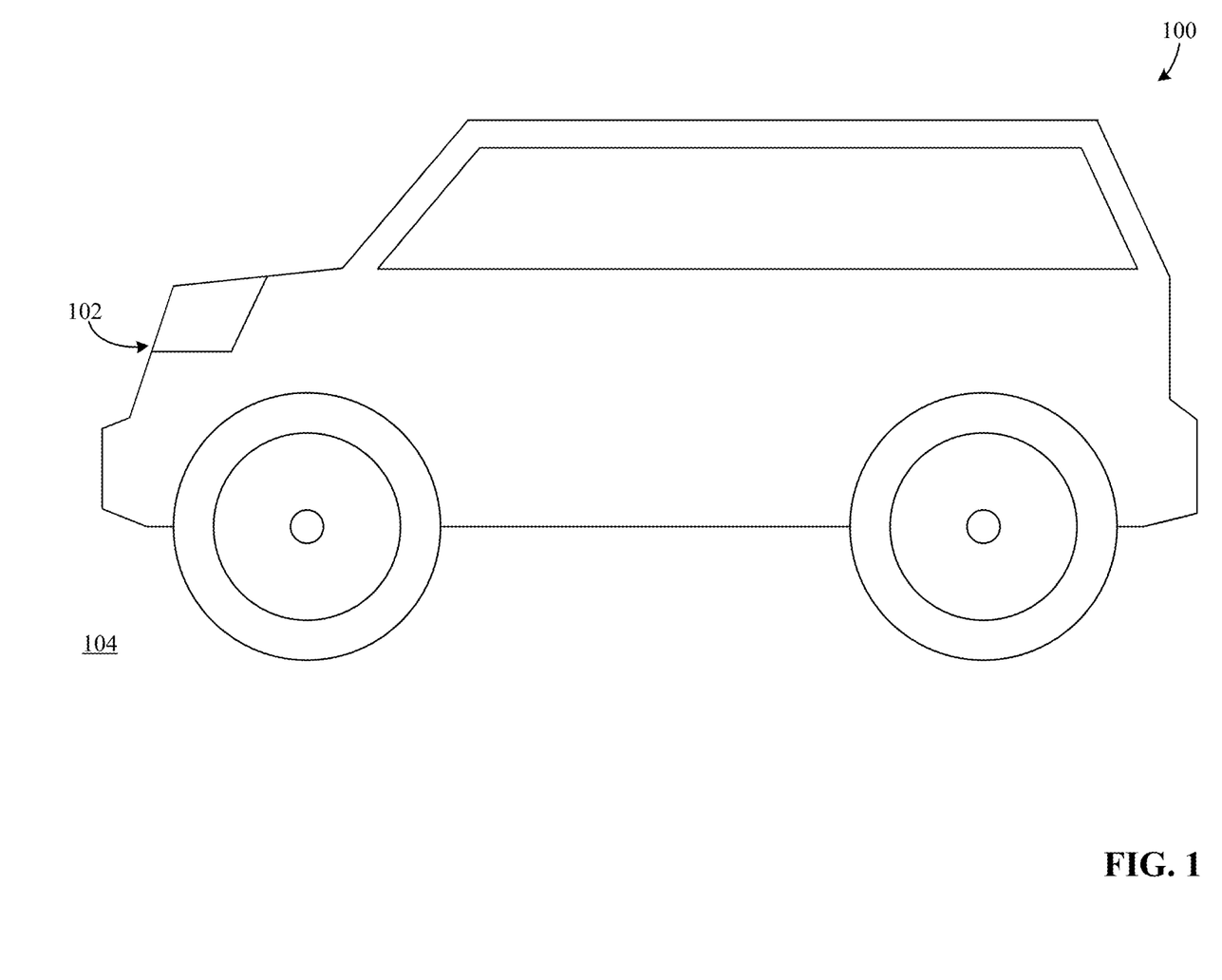
FIG. 1 is a schematic illustration of an example vehicle in which examples disclosed herein can be implemented.

FIG. 1 is a schematic illustration of an example vehicle (e.g., a car, a truck, a sport utility vehicle (SUV), etc.) 100 in which examples disclosed herein can be implemented. According to the illustrated example of FIG. 1, the vehicle 100 includes one or more example lighting devices 102 (one of which is shown in this example) such as, for example, one or more headlamps (sometimes referred to as headlights), one or more tail lamps (sometimes referred to as tail lights), one or more side markers, etc. In particular, the lighting device(s) 102 of FIG. 1 generate light and emit the light away from the vehicle 100, for example, to illuminate an example driving surface (e.g., concrete, asphalt, dirt, etc.) 104 on which the vehicle 100 is positioned and/or provide visual indication(s) to another vehicle and/or a pedestrian. As such, the lighting device(s) 102 are operatively and/or communicatively couple (e.g., via a transmission or signal wire, a bus, radio frequency, etc.) to one or more electrical components to enable lighting functionality such as, for example, a controller (e.g., an electronic control unit (ECU)) of the vehicle 100. For example, the lighting device(s) 102 receive power and/or control or command signal(s) from the vehicle controller, thereby generating the light. Although FIG. 1 depicts the vehicle 100 as having a single headlamp, in some examples, the vehicle 100 is implemented differently (e.g., with one or more additional and/or different lighting devices).

Figure 2:
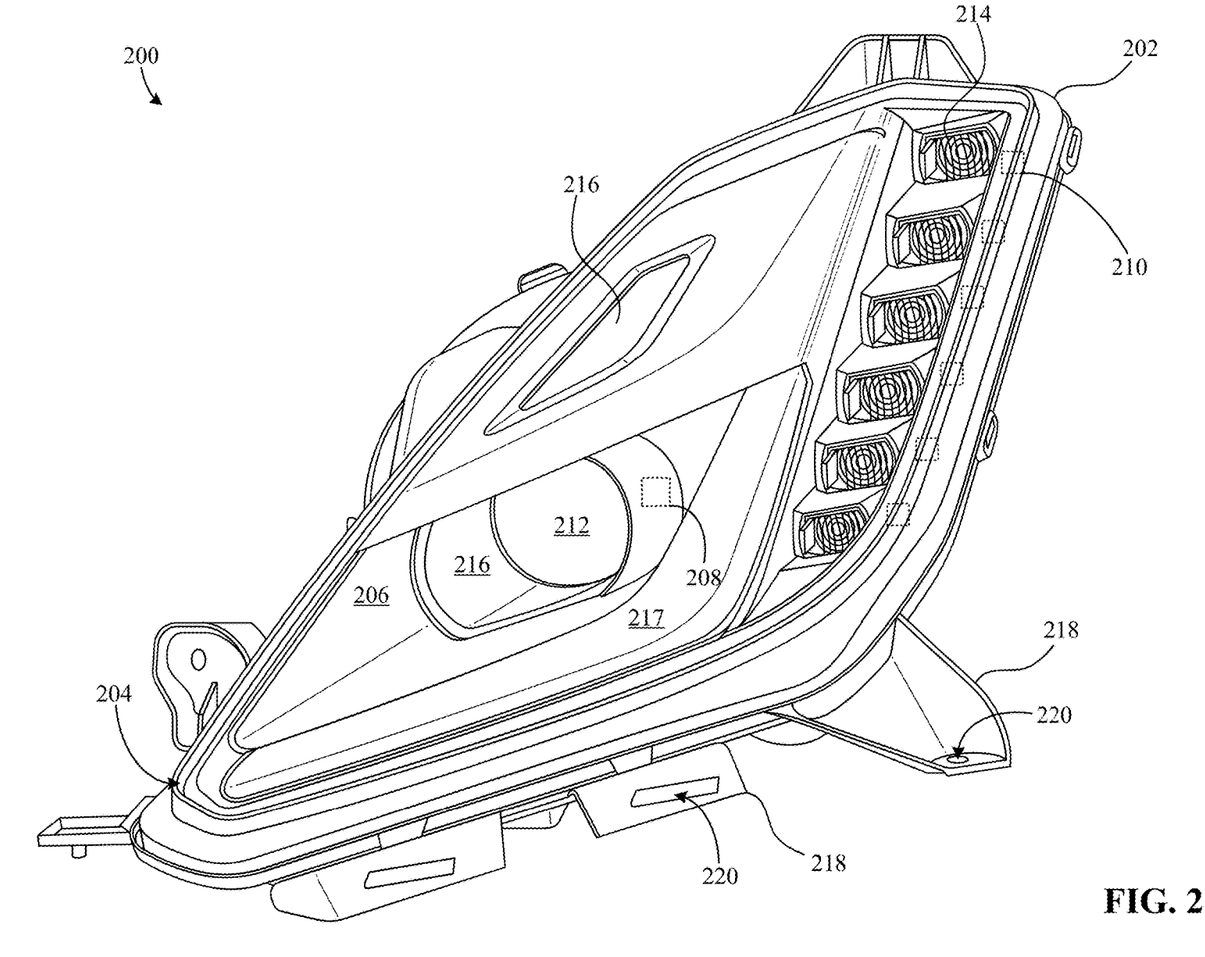
FIG. 2 is a detailed view of an example vehicle lighting device in which examples disclosed herein can be implemented.

FIG. 2 is a detailed view of an example lighting device (e.g., a vehicle lamp such as a headlamp) 200 in which examples disclosed herein can be implemented. In some examples, the lighting device 200 corresponds to one or more of the lighting devices 102 of FIG. 1. The lighting device 200 of FIG. 2 includes an example housing 202 and an example bezel 204 affixed to housing 202, for example, via one or more fasteners (e.g., screws, clips, rivets, etc.) and/or fastening techniques or methods (e.g., via a weld, an adhesive, etc.). The housing 202 of FIG. 2 is size, shaped, structured, and/or otherwise configured to support and/or carry one or more components associated with the lighting device 200 such as, for example, the bezel 204, one or more reflectors, one or more light sources, one or more cables or wires for providing power and/or communication, etc. According to the illustrated example of FIG. 2, at least a portion of an outer or exterior surface 206 of the bezel 202 includes a visual design and, in some examples, is configured to decouple and/or separate from the bezel 202, as discussed further below in connection with FIGS. 3-9. As used herein, the term "visual design" refers to at least a portion of an outer or exterior surface of a bezel that has one or more of: a particular geometry or shape; a particular contour and/or perimeter; one or more surface features and/or structures (e.g., one or more protrusions, one or more recesses, one or more openings, etc.); one or more colors; and/or one or more graphics.

In some examples, the lighting device 200 also includes one or more example light sources (e.g., LED(s), light bulb(s), etc.) 208, 210 coupled thereto and positioned proximate to the bezel 204, seven of which are shown in this example (i.e., a primary light source 208 and six secondary light sources 210). In such examples, the light source(s) 208, 210 are operatively and/or communicatively coupled (e.g., via a signal or transmission wire, a bus, radio frequency, etc.) to the controller associated with the vehicle 100 to provide lighting functionality in response the power and/or the control or command signal(s) provided by the controller. In response to receiving the power and/or the control or command signal(s), the light sources 208, 210 generate light (e.g., a light beam) and emit the light away from the lighting device 200 (e.g., onto the driving surface 104). For example, the primary light sources 208 generates a first light (e.g., a low beam and/or a high beam) and emits the light onto at least a portion of the driving surface 104, which facilitates viewing the driving surface 104 during certain driving conditions. In some such examples, a direction along which the first light is aimed is adjustable (sometimes referred to as beam aiming), for example, via one or more actuators and/or motors operatively coupled between the vehicle controller and a reflector associated with the first light source 208. In another example, at least one of the secondary light sources 210 (sometimes referred to as a turn signal) similarly generates light and emits the light toward another vehicle and/or a pedestrian, which indicates whether the vehicle 100 is being operated in a particular manner and/or performing a particular maneuver (e.g., changing lanes, turning, etc.).

In some examples, the lighting device 200 includes one or more lenses (e.g., constructed of a transparent material such as plastic, glass, etc.) to protect and/or cover the light source(s) 206 and/or one or more other components of the lighting device 200. For example, the lighting device 200 includes a first or primary lens that affixes to the housing 202 and extends substantially over the housing 202 to allow light to pass therethrough, which is removed from the lighting device 200 in this example for clarity. Accordingly, at least a portion (e.g., one or more example films or skins) of the bezel 204 is visible through the first lens from a location external to the vehicle 100. Further, the lighting device 200 of FIG. 2 includes a second lens (e.g., a projector lens) 212 that extends over and/or covers the first light source 208, which concentrates, focuses, and improves a characteristic associated with the light emitted from the first light source 208 in some examples. Further still, each of the secondary light sources 210 is similarly associated with a respective third lens 214 of the light device 200.

In some examples, the bezel 204 is shaped, formed, structured, and/or otherwise configured to receive and/or affix to one or more components associated with the lighting device 200 such as, for example, one or more of the first lens, the second lens 212, the third lens(es) 214, example trim 216, and/or a day time running lamp (DRL) 217 of the lighting device 200. For example, the lens(es) 212, 214 and/or the trim 216 snap-fits with at least a portion of the bezel 204.

In some examples, to facilitate coupling the housing 202 to the vehicle 100, the housing 202 includes one or more example adaptors 218. The adaptors 218 of FIG. 2 are positioned on the housing 202 and extend away therefrom to engage and/or couple to a portion of the vehicle 100, for example, via one or more fasteners and/or fastening methods or techniques. In particular, at least some of the adaptors 218 includes openings (e.g., holes and/or slots) 220 to receive the fastener(s) and/or the portion of the vehicle 100.

Figures 3, 4, 5:
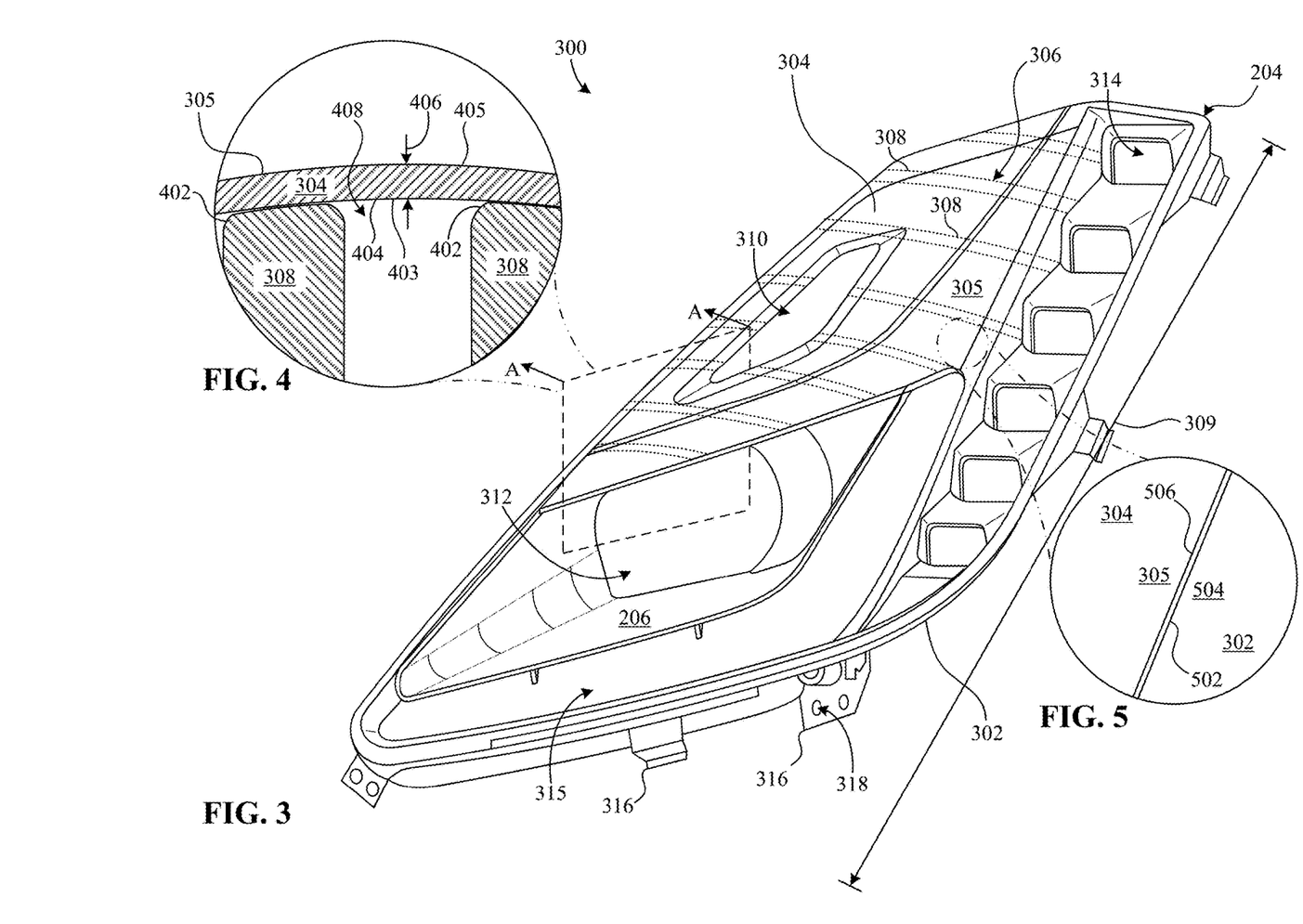
FIG. 3 is a detailed view of an example bezel and shows a first configuration thereof in accordance with the teachings this disclosure.
FIG. 4 is a cross-sectional view of the example bezel of FIG. 3 along line A-A.
FIG. 5 is an enlarged view of the example bezel of FIG. 3 and shows a portion of an outer surface thereof.

FIG. 3 is detailed view of the example bezel 204 of FIG. 2 and shows a first example configuration 300 thereof. The bezel 204 of FIG. 3 includes first portion 302 at least partially defining a body of the bezel 204 and a second portion (e.g., a first film) 304 affixed to the first portion 302. In particular, the first portion 302 includes and/or at least partially defines a first example skeleton 306 (as represented by the dotted/dashed lines in FIG. 3) for carrying and/or supporting the second portion 304, which may be referred to as a bezel skeleton. Further, the second portion 304 has an outer surface 305 that at least partially defines the outer surface 206 and the visual design of the bezel 204, which may be referred to as a bezel skin.

In some examples, the first portion 302 and/or the first skeleton 306 and the second portion 304 are shaped, sized, structured and/or or otherwise configured to couple together and decouple or separate from each other, for example, via snap-fitting and/or one or more other appropriate coupling methods or techniques. Stated differently, the second portion 304 is removably coupled to the first portion 302 and/or the first skeleton 306 such that the second portion 304 is removable and/or separable from the first skeleton 306, which allows or enables a different bezel skin to affix to the first skeleton 306, as discussed further below in connection with FIG. 6. However, in some examples, the first portion 302 and the first skeleton 306 and/or the second portion 304 are formed as an integral component such that first portion 302 cannot be removed or separated. As shown in FIG. 3, the second portion 304 of the bezel 204 extends over and/or at least partially covers the first skeleton 306 such that the first skeleton 306 is not exposed and/or is hidden beneath the second portion 304.

In some examples, the first skeleton 306 includes one or more example ribs 308 extending beneath and/or near the second portion 304 to provide support thereto, eight of which are shown in this example. As shown in FIG. 3, the rib(s) 308 extend away from a rightmost (in the orientation of FIG. 3) side of the bezel 204 between opposing ends of the second portion 304. Further, the rib(s) 308 are distributed along the first portion 302 of the bezel 204 across at least a part of a length 309 (e.g., the entire length 309) of the bezel 204. In some examples, all of the rib(s) 308 are curved and/or straight. Further, in some examples, at least some of the rib(s) 308 are sized and/or shaped differently than the other ones of the rib(s) 308. In examples where the first skeleton 306 does not form the entire first portion 302 of the bezel 204, the first skeleton 306 and/or the rib(s) 308 are considered to be extensions of the first portion 302 of the bezel 204. Further, in such examples, the first skeleton 306 and the first portion 302 are produced separately and then coupled together. However, in some examples, the first skeleton 306 and the first portion 302 are produced simultaneously such that they form an integral part.

Although the FIG. 3 depicts the first skeleton 306 having the rib(s) 308, in some examples, the first skeleton 306 is implemented differently, as discussed further below in connection with FIGS. 7-9. Further, although FIG. 3 depicts the first skeleton 306 forming and/or defining only a part of the first portion 302 of the bezel 204, in some examples, the entire first portion 302 of the bezel 204 is formed and/or defined by the first skeleton 306.

As shown in FIG. 3, the bezel 204 includes one or more openings 310, 312, 314, 315 (i.e., a first opening 310, a second opening 312, a third opening 314, and a fourth opening 315) that are particularly sized and/or shaped, which facilitate coupling the component(s) of the lighting device 100 to the bezel 204 and/or allows the light generated by the light source(s) 208, 210 to be emitted therethrough. For example, the first and second openings 310, 312 of the bezel 204 are configured to receive at least a portion of the trim 216. Additionally, the second opening 312 receives the second lens 212 and/or allows the light generated by the first light source 208 to pass therethrough. Further, in this example, the third opening 314 is configured to receive one of the third lens(s) 214 and/or allows the light generated by one of the secondary light source(s) 210 to pass therethrough. As shown in FIG. 3, similar to the third opening 314, the bezel 204 includes one or more other openings for the other secondary light sources 210, each of which is configured to receive a respective one of the lenses 214 and/or light emitted by a respective one of the secondary light source(s) 210. Further still, the fourth opening 315 is configured to receive the DRL 217.

In some examples, to facilitate coupling the bezel 204 to the housing 202 and/or one or more other components (e.g., the first lens) of the lighting device 200, the bezel 204 of FIG. 3 includes one more example adaptors 316 positioned on the first portion 302. The adaptors 316 of FIG. 3 extend away from the first portion 302 to receive a portion of the housing 202 and/or the lighting component(s). In some examples, at least some of the adaptors 316 include one or more openings 318, for example, to receive fastener(s) for coupling the bezel 204 to the housing 202.

As shown in FIG. 4, at least some (e.g., all) of the rib(s) 308 have respective outer surfaces 402 for supporting a first side 403 of the second portion 304. In some examples, the outer surface(s) 402 are sized and/or shaped to match, conform to, and/or otherwise at least partially engage or directly contact an inner surface (e.g., a curved and/or a flat or even surface) 404 of the first side 403 opposite a second side 405 of the second portion 304 having the outer surface 305. For example, when a portion of the inner surface 404 is curved, a corresponding portion of the outer rib surface(s) 402 is similarly curved. In another example, when a portion of the inner surface 404 is flat or even, a corresponding portion of the outer rib surface(s) 402 is similarly flat or even. In this manner, the second portion 304 of the bezel 204 is properly supported by the first skeleton 306 when positioned thereon.

Additionally, in examples where one or more of the light sources 208, 210 of the lighting device 200 are positioned behind and/or proximate to the second portion 304, the second portion 304 is configured to transmit the light emitted by the light source(s) 208, 210 therethrough, which reveals the design associated with the second portion 304 when the light is received by and/or directed on the first side 403 (i.e., the second portion 304 is translucent). Further, in such examples, the second portion 304 hides the light source(s) 208, 210 associated therewith when the light source(s) 208, 210 are off and/or otherwise not generating light (i.e., the second portion 304 is opaque). Further still, in some examples, the second portion 304 is configured to prevent glare in the lighting device 200. For example, the outer surface 305 is smooth and/or otherwise structured to disperse light that is received by and/or directed on the outer surface 305.

The inner surface 404 of FIG. 4 is substantially smooth and/or continuous. However, in some examples, the inner surface 404 may include one or more relatively small surface defects such as bump(s), protrusion(s), recess(es), etc. As shown in FIG. 4, the second portion 304 has a substantially uniform thickness 406 defined between the outer and inner surfaces 305, 404 that, in some examples, is 2 mm or less (e.g., between about 0.1 mm and 2 mm). That is, the thickness 406 may slightly vary across the second portion 304.

In some examples, to reduce weight of the bezel 204, one or more example recessed areas 408 are formed by and/or defined between at least some of the rib(s) 308 and extend into the outer surface(s) 402, one of which is shown in this example that is interposed between adjacent ones (i.e., a pair) of the rib(s) 308. Additionally or alternatively, in some examples, aspects of the rib(s) 308 depicted in connection with FIG. 4 such as, for example, the outer surface(s) 402 and/or the recessed areas 408, likewise apply to one or more other structures (e.g., the cellular pattern(s) 800, 900 (shown in FIGS. 8 and 9)) associated with the first skeleton 306 and/or any other appropriate bezel skeleton.

As shown in FIG. 5, the first portion 302 of the bezel 204 has a first edge 502 at least partially defining a perimeter of the first portion 302 and/or a first outer surface 504 thereof. Similarly, the second portion 304 of the bezel 204 has a second edge 506, different from the first edge 502, at least partially defining a perimeter of the second portion 304 and/or the outer surface 305 thereof. In some such examples, when the second portion 304 is properly affixed to the first portion 302 and/or the first skeleton 306, the first and second edges 502, 506 and/or the outer surfaces 504, 305 associated therewith are proximate to each other and substantially adjacent and/or flush. As a result, the outer surfaces 504, 305 of the respective portions 302, 304 cooperatively form and/or define a substantially smooth and/or continuous outer surface of the bezel 204, which may be visually appealing to the driver and/or vehicle owner. In some examples, the first and second edges 502, 506 and/or the outer surfaces 504, 305 associated therewith at least partially overlap each other.

Figure 6:
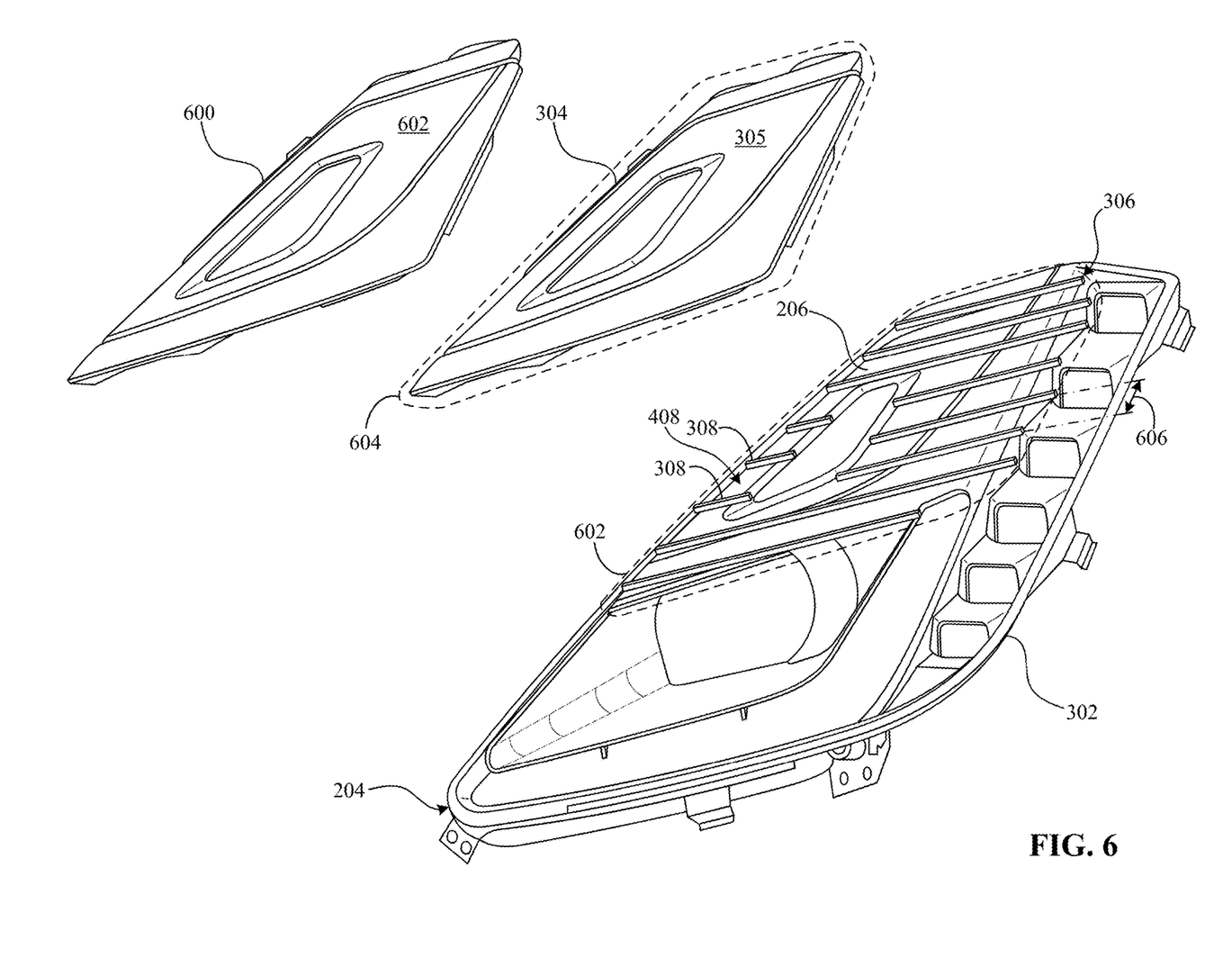
FIG. 6 is a partial exploded view of the example bezel of FIG. 3 and shows an example bezel skeleton in accordance with the teachings of this disclosure.

FIG. 6 is a partial exploded view of the bezel 204 and shows the first skeleton 306 at least partially exposed. According to the illustrated example of FIG. 6, the second portion 304 of the bezel 204 is removed or separated from the second portion 302 and/or the first skeleton 306 (e.g., after production of the first skeleton 306) such that a third bezel portion (e.g., a second film that is visually different from the first film) 600 is enabled to affix to the first skeleton 306. In particular, the third bezel portion 600 of FIG. 6 is substantially different relative to the second portion 304 of the bezel 204 with respect to shape, size, structure, color, etc. That is, an outer surface 602 of the third portion 600 includes a visual design that is different from the visual design of the outer surface 305 of the second portion 304.

In some examples, the first skeleton 306 includes and/or at least partially defines a first contour 602 (as represented by the dotted/dashed lines in FIG. 6) that is sized and/or shaped to substantially match and/or conform to a second contour 604 (as represented by the dotted/dashed lines of FIG. 6) defined by the second portion 304 (and/or the third portion 600) of the bezel 204. That is, the contour 602 associated with the first skeleton 306 has a first shape (e.g., a regular or irregular polygon) that is similar to a second shape of the contour 604 associated with the second portion 304 (and/or the third portion 600). In this manner, the first skeleton 306 is substantially covered by and/or hidden beneath the second portion 304 (and/or the third portion 600) when coupled together.

As shown in FIG. 6, the rib(s) 308 of the first skeleton 306 are positioned on at least a portion (e.g., a relatively thin portion) of the outer surface 206 of the bezel 204 and/or extend away therefrom to receive the inner surface 404 of the second portion 304. That is, in some examples, the outer surface 206 of the bezel 204 forms the recessed area(s) 408 with the rib(s) 308. However, in some examples, openings are disposed between at least some of the rib(s) 308 and extend entirely through the bezel 204, which further reduces weight of the bezel 204. Additionally, in this example, the rib(s) 308 are spaced from each other by a distance (e.g., 0.1 inches, 0.5 inches, 1 inch, 2 inches, etc.) 606. Further, in some examples, the rib(s) 308 of FIG. 6 extend substantially in the same direction (e.g., the rib(s) 308 are parallel).

Figures 7, 8, 9:
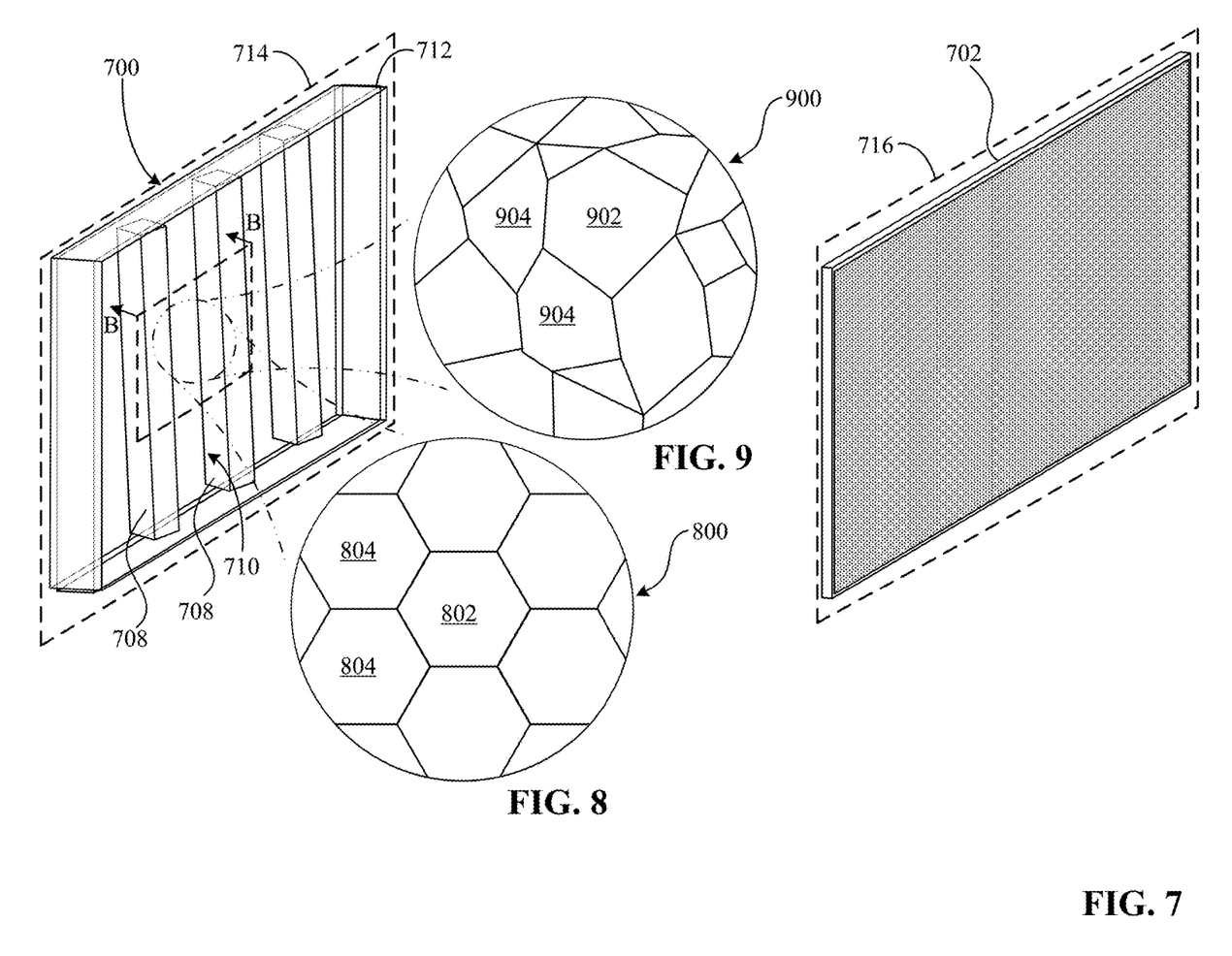
FIG. 7 is a detailed view of another example bezel skeleton and an example film in accordance with the teachings of this disclosure.
FIGS. 8 and 9 are cross-sectional portion-views of the example bezel skeleton of FIG. 7 along line B-B and show example structural patterns associated therewith.

FIG. 7 is a detailed view of a second example skeleton 700 for the bezel 204 and an example film (e.g., plastic and/or acrylic) 702 separated from the second skeleton 700 in accordance with the teachings of this disclosure. In some examples, the second skeleton 700 of FIG. 7 corresponds to at least a portion of the first skeleton 306 of the bezel 204, and the film 702 corresponds to the second portion 304 and/or the third portion 600 of the bezel 204.

The second skeleton 700 of FIG. 7 is implemented, for example, via one or more additive manufacturing and/or injection molding processes and/or methods or techniques. In such examples, the second skeleton 700 is constructed of PC, one or more materials associated with additive manufacturing (e.g., Acrylonitrile Butadiene Styrene (ABS), Polylactic Acid (PLA), etc.), and/or any other appropriate material.

The film 702 of the FIG. 7 is implemented, for example, via injection molding, compression molding, and/or any other appropriate process and/or method or technique. In such examples, the film 702 is constructed of PMMA, PC, and/or any other appropriate polymer or plastic resin. That is, in some examples, the film 702 is a particular IMD and/or IML, which may be desired by a driver or a vehicle owner when viewing the bezel 204.

As previously mentioned, in some examples, the film 702 is configured to couple to and decouple or separate from the second skeleton 700. In such examples, the film 702 is produced separately from the second skeleton 700 and then affixed thereto.

As shown in FIG. 7, the second skeleton 700 includes a particular structural pattern 706 that is formed and/or defined by one or more rib(s) 708 (three of which are shown in this example) that are spaced from each other such that respective openings 710 are positioned between at least some of the rib(s) 708. As such, the structural pattern of FIG. 7 is considered to be ribbed. According the illustrated example of FIG. 7, the second skeleton 700 includes an outer frame 712 that substantially forms and/or defines a contour 714 of the skeleton 700, which is shaped to match and/or conform to a contour 716 of the film 704 in some examples. As previously mentioned, the contours 714, 716 can have any appropriate shape with which to form and/or define one or more portions of the bezel 204. As shown in FIG. 7, the rib(s) 708 extend between opposing ends of the frame 710 (e.g., from a first end of the frame 712 to a second end of the frame 712).

Additionally or alternatively, in some examples, the skeleton 700 includes one or more other structural patterns that are regular or irregular and may be contained in the frame 710. For example, as shown in FIG. 8, at least a portion of the second skeleton 700 includes a cross-section defining a first cellular pattern 800 that has regular shapes and/or polygons (e.g., circles, ovals, ellipses, triangles, squares, rectangles, pentagons, hexagons, etc.). In this example, the first cellular pattern 800 includes at least one central cell (e.g., a hexagonal cell) 802 surrounded by one or more secondary cells (e.g., hexagonal cells) 804 (six of which are shown in this example). The cells 802, 804 of FIG. 8 are similar to each other with respect to shape and/or structure, each of which at least partially defines an empty space or cavity within the second skeleton 700. As such, the first cellular pattern 800 is considered to be regular in this example. In this manner, disclosed examples reduce weight of the second skeleton 700 (e.g., reduces weight the bezel 204 and/or the vehicle lighting device 200) while maintaining strength, rigidity, and/or structural integrity thereof.

In another example, as shown in FIG. 9, at least a portion of the second skeleton 700 includes a cross-section defining a second cellular pattern 900, different from the first cellular pattern 800, that has irregular shapes and/or polygons. Similar to the first cellular pattern 800, the second cellular pattern 900 includes at least one central cell 902 that is surrounded multiple secondary cells 904, each of which at least partially defines an empty space or cavity within the second skeleton 700. In some examples, both the first and second cellular patterns 800, 900 are considered to be polygonal.

In some examples, portions (e.g., edges) of one or more of the cells 802, 804, 902, 904 at least partially form and/or define the outer surface 402 of the first skeleton 306. Further, in some examples, the first cellular pattern 800 and/or the second cellular pattern 900 are used to implement one or more of the rib(s) 708. That is, in such examples, a cross-section of a rib 708 includes the cellular pattern(s) 800, 900. However, in some examples, the second skeleton 700 is formed and/or defined by the first cellular pattern 800 and/or the second cellular pattern 900, but not the rib(s) 708. Additionally, in some examples, the second skeleton 700 includes a combination of the rib(s) 708, the first cellular pattern 800, and/or the second cellular pattern 900. Although FIGS. 7-9 depict particular structural patterns of the second skeleton 700, in some examples, the second skeleton 700 is implemented using one or more other structural patterns (e.g., one or more lattice structures) such that the film 702 is sufficiently supported when coupled to the second skeleton 700.

Although certain example methods, apparatus, and articles of manufacture have been described herein, the scope of coverage of this patent is not limited thereto. On the contrary, this patent covers all methods, apparatus, and articles of manufacture fairly falling within the scope of the claims of this patent. Obviously, numerous modifications and variations are possible in light of the above teachings. It is therefore to be understood that within the scope of the appended claims, the invention may be practiced otherwise than as specifically described herein.

Vehicle(s) and/or device(s) that include one or more of the features in the foregoing description provide numerous advantages. In particular, bezel apparatus for use with vehicle lamps and related methods disclosed herein provide an easily customizable bezel and/or vehicle lamp while reducing associated part weight as well as production cost.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A bezel of a motor vehicle lamp, comprising:
   a skeleton defining a portion of the bezel, the skeleton configured to provide structural integrity to the bezel;
   a film disposed on an exterior surface of the skeleton and configured to cover the skeleton, the film comprising a first side configured to contact the skeleton and a second side opposite to the first side and including a visual design; and
   a coupling mechanism configured to couple the film to the skeleton to provide a completed bezel, wherein
   the film is an in-mold decoration (IMD) or an in-mold label (IML), and
   the film has a substantially uniform thickness that is 2 mm or less.

2. The bezel of claim 1, wherein the skeleton includes ribs distributed along a portion of the bezel and extending across and below an inner surface of the first side of the film.

3. The bezel of claim 2, wherein the ribs are disposed on an outer surface of the bezel such that recessed areas are formed by the ribs and the outer surface of the bezel.

4. The bezel of claim 1, wherein the skeleton includes a cross-section that defines a cellular pattern therein.

5. The bezel of claim 4, wherein the cellular pattern includes polygons.

6. The bezel of claim 1, wherein the skeleton defines an outer surface that is shaped to conform to an inner surface of the first side of the film.

7. The bezel of claim 1, wherein an outer surface of the second side of the film and an outer surface of the bezel are adjacent to cooperatively form a substantially smooth outer surface.

8. The bezel of claim 1, wherein the film includes an opening disposed on the outer surface that is shaped to receive a lens, a trim, a day time running lamp (DRL), or a light beam associated with the vehicle lamp.

9. The bezel of claim 1, wherein the film is configured to transmit light therethrough to reveal the design when the light is received by the first side of the film.

10. The bezel of claim 1, wherein the film is configured to separate from the skeleton.

11. A vehicle lamp, comprising:
    a bezel affixed to a housing of the vehicle lamp, the bezel having a first portion and a second portion that are configured to couple to and decouple from each other, the second portion being disposed on an exterior surface of the first portion, the first portion at least partially defining a body of the bezel, the second portion at least partially defining an exterior surface of the bezel having a visual design, wherein
    the second portion is an in-mold decoration (IMD) or an in-mold label (IML), and
    the second portion has a substantially uniform thickness that is 2 mm or less.

12. The vehicle lamp of claim 11, wherein the first portion of the bezel includes a skeleton positioned beneath an inner surface of the second portion to support the second portion.

13. The vehicle lamp of claim 12, wherein the skeleton defines a first contour having a first shape and the second portion defines a second contour having second shape that is similar to the first shape.

14. The vehicle lamp of claim 11, wherein the first portion of the bezel has a first edge defining a first outer surface of the first portion, and wherein the second portion has a second edge proximate to the first edge and defining a second outer surface of the second portion, the first and second edges being adjacent such that the first and second outer surfaces define a substantially continuous surface.

15. The vehicle lamp of claim 11, wherein the second portion is translucent.

16. A method to provide a bezel of a motor vehicle lamp, comprising:
    coupling a film to a skeleton to provide a completed bezel, wherein
    the skeleton defines at least a portion of the bezel, the film being disposed on an exterior surface of the skeleton and configured to cover the skeleton, the skeleton configured to provide structural integrity to the bezel;
    the film includes a first side configured to contact the exterior surface of the skeleton and a second side opposite to the first side and including a visual design;
    the film is an in-mold decoration (IMD) or an in-mold label (IML); and
    the film has a substantially uniform thickness that is 2 mm or less.

17. The method of claim 16, further comprising decoupling the film from the skeleton.

* * * * *